(12) United States Patent
Brown et al.

(10) Patent No.: US 8,939,621 B2
(45) Date of Patent: Jan. 27, 2015

(54) HEADLAMP WITH BACKLIT SIDE BEZEL SIGNATURE IMAGE

(75) Inventors: David A. Brown, West Bloomfield, MI (US); Arun Kumar, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1123 days.

(21) Appl. No.: 12/817,496

(22) Filed: Jun. 17, 2010

(65) Prior Publication Data

US 2011/0310610 A1 Dec. 22, 2011

(51) Int. Cl.
*B60Q 1/00* (2006.01)
*B60Q 3/00* (2006.01)
*B60Q 11/00* (2006.01)
*F21S 8/10* (2006.01)

(52) U.S. Cl.
CPC ............ *F21S 48/1241* (2013.01); *F21S 48/15* (2013.01)
USPC .......................................... 362/507; 362/546

(58) Field of Classification Search
CPC ......... F21S 48/15; B60Q 1/2619; B60Q 1/26; G09F 2013/044
USPC ................. 362/253, 487, 506, 507, 540, 546; 340/468
See application file for complete search history.

(56) References Cited

U.S. PATENT DOCUMENTS 4,631,516 A * 12/1986 Clinker .......................... 340/464
6,382,821 B1 * 5/2002 Heyer et al. .................... 362/509
7,278,762 B2 10/2007 Schottland et al.
2001/0055212 A1 * 12/2001 Phillips .......................... 362/487
2005/0207164 A1 * 9/2005 Holtz et al. .................... 362/311
2008/0212189 A1 * 9/2008 Baur et al. ..................... 359/604
2009/0021942 A1 * 1/2009 Kim ............................... 362/268
2009/0257241 A1 * 10/2009 Meinke et al. ................ 362/546
2010/0259947 A1 * 10/2010 Dolan ............................ 362/509

FOREIGN PATENT DOCUMENTS

FR 2894321 A1 6/2008

OTHER PUBLICATIONS

Vrieze, et al., SAE Technical Paper Series 980876, Matching the Model: Plastic Light Fiber Extraction Targeted at SAE Specifications, Feb. 23-26, 1998.
Tessnow, et al., SAE Technical Paper Series 2007-01-1041, Application of LED Light Sources with Light Guide Optics, Apr. 16-19, 2007.

* cited by examiner

*Primary Examiner* — Anh Mai
*Assistant Examiner* — Zachary J Snyder
(74) *Attorney, Agent, or Firm* — Jason Rogers; MacMillan, Sobanski & Todd, LLC

(57) ABSTRACT

A lighting system for a vehicle comprises a headlamp light source. A trim piece is mounted adjacent the light source having an inner surface illuminated by light from the light source and an outer surface visible from outside the vehicle. The trim piece comprises a light transmitting plastic body, wherein a signature image is formed on the body having a foreground region and a background region. The foreground region has a corresponding surface characteristic on the inner and outer surfaces within the foreground region different from a corresponding surface characteristic on the inner and outer surfaces within the background region so that more light from the light source is transmitted through the foreground region than through the background region. The outer surface may be fully metalized to provide a pleasing appearance under ambient light conditions.

13 Claims, 5 Drawing Sheets

HEADLAMP WITH BACKLIT SIDE BEZEL SIGNATURE IMAGE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to motor vehicle exterior lighting systems, and, more specifically, to a trim piece bezel and illumination system having a signature image such as a name or logo that is visible under both ambient light (e.g., in the daytime) and vehicle-supplied light (e.g., from the headlamp at night).

In the competitive motor vehicle market, vehicle styling is a very important aspect of design. With regard to vehicle lighting systems, various important illumination functions must be achieved while maintaining attractive styling. Various types of accent lighting have been employed for both headlamps and tail lamps in order to give a distinctive appearance to individual vehicle models.

Accent lighting is often obtained using dedicated light sources (such as LEDs) which can be easily incorporated into a headlamp or taillight housing or other vehicle structures to configure the lighting to almost any desired location, shape, or color. While dedicated light sources are easy to control and to adapt to any desired configuration, they are expensive to manufacture and install. Furthermore, independent light sources might not be permitted by governmental regulations. For example, when headlamps are set to low beam, only certain lamp functions (e.g., park lamps and side marker or position lamps) are usually allowed—so that independently driven signature lighting cannot be used.

It is also known in the art to tap the main light source, such as the headlamp (high beam and/or low beam), to redirect a certain amount of light to an accent feature. In such systems, however, it is a challenge to produce even illumination (e.g., with no hot-spots) while utilizing only inexpensive components. It would be desirable to obtain illumination of a signature image (such as a logo, name, or other graphic or textual content) using inexpensive molded plastic parts with even illumination and that has an attractive appearance under both ambient light conditions (e.g., daylight) and backlit conditions, and that avoids creation of glare that may hamper visibility of other drivers.

SUMMARY OF THE INVENTION

In one aspect of the invention, a lighting system for a vehicle comprises a headlamp light source. A trim piece is mounted adjacent the headlamp light source having an inner surface illuminated by light from the light source and an outer surface visible from outside the vehicle. The trim piece comprises a light transmitting plastic body, wherein a signature image is formed on the body having a foreground region and a background region. The foreground region has a corresponding surface characteristic(s) on the inner and outer surfaces within the foreground region different from a corresponding surface characteristic(s) on the inner and outer surfaces within the background region so that more light from the light source is transmitted through the foreground region than through the background region. The resulting difference in light transmission creates contrast to make the signature image visible, while the difference in surface characteristics also makes the signature image visible under outside, ambient light. Since the light transmission can be well controlled, the creation of glare is easily avoided.

DETAILED DESCRIPTION OF PREFERRED EMBODIMENTS

Figure 1:
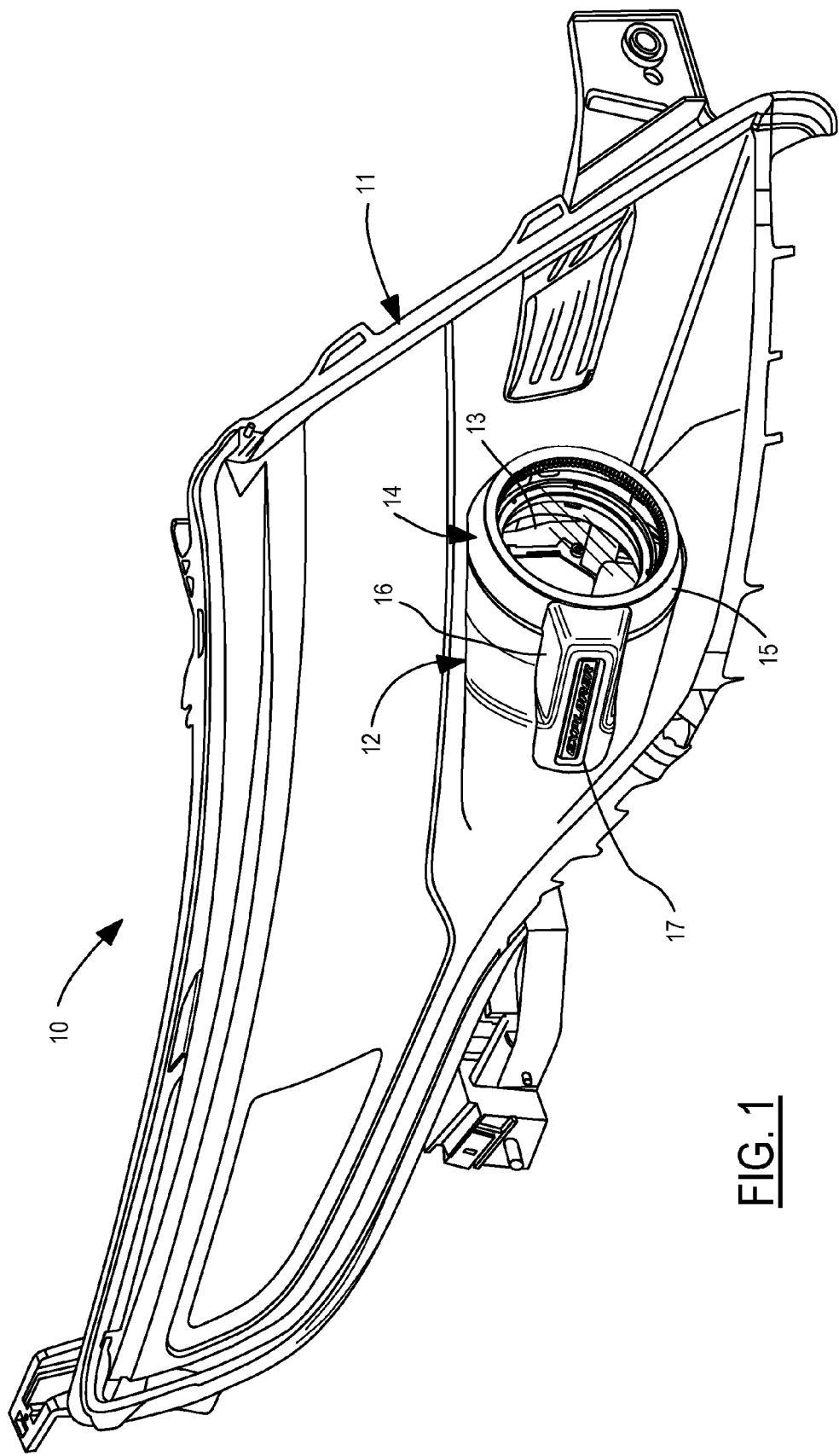
FIG. 1 is a perspective view of a headlamp system.

Referring now to FIG. 1, a headlamp assembly 10 includes an outer lens and housing 11 containing a projection headlamp system 12. A lens 13 projects light from a light source through outer lens 11 to illuminate a roadway in front of the vehicle.

As a first illustrative embodiment of the present invention, a trim piece 14 is mounted in conjunction with headlamp system 12. Trim piece 14 in this embodiment includes a front ring 15 having a side bezel 16 for forming a signature image 17. Trim piece 14 is preferably molded from a polycarbonate material which is white light transmissive. Trim piece 14 has a Class A surface which is visible from outside the vehicle and a Class B on the non-visible side. All or a part of the Class A surface preferably has a metallization layer formed by spraying a very thin layer of aluminum over the molded polycarbonate, as is commonly done in the industry for giving the appearance of a metal or chrome part.

Under normal external lighting conditions, the metallization layer gives the appearance of a solid metal part. Under sufficient back illumination, the metallization layer is thin enough to transmit light from the headlamp system out of the Class A surface, if desired. The present invention includes embodiments wherein the metallization of the Class A surface covers the signature image 17 as well as embodiments wherein the metallization does not cover signature image 17. The metallization layer together with selective surface treatments (e.g., textures) of the molded part creating selective amounts of light diffusion are used to create light transmission having contrast between foreground regions and background regions in the signature image to give the signature image a pleasing appearance when backlit using light from the headlamp.

Figure 2:
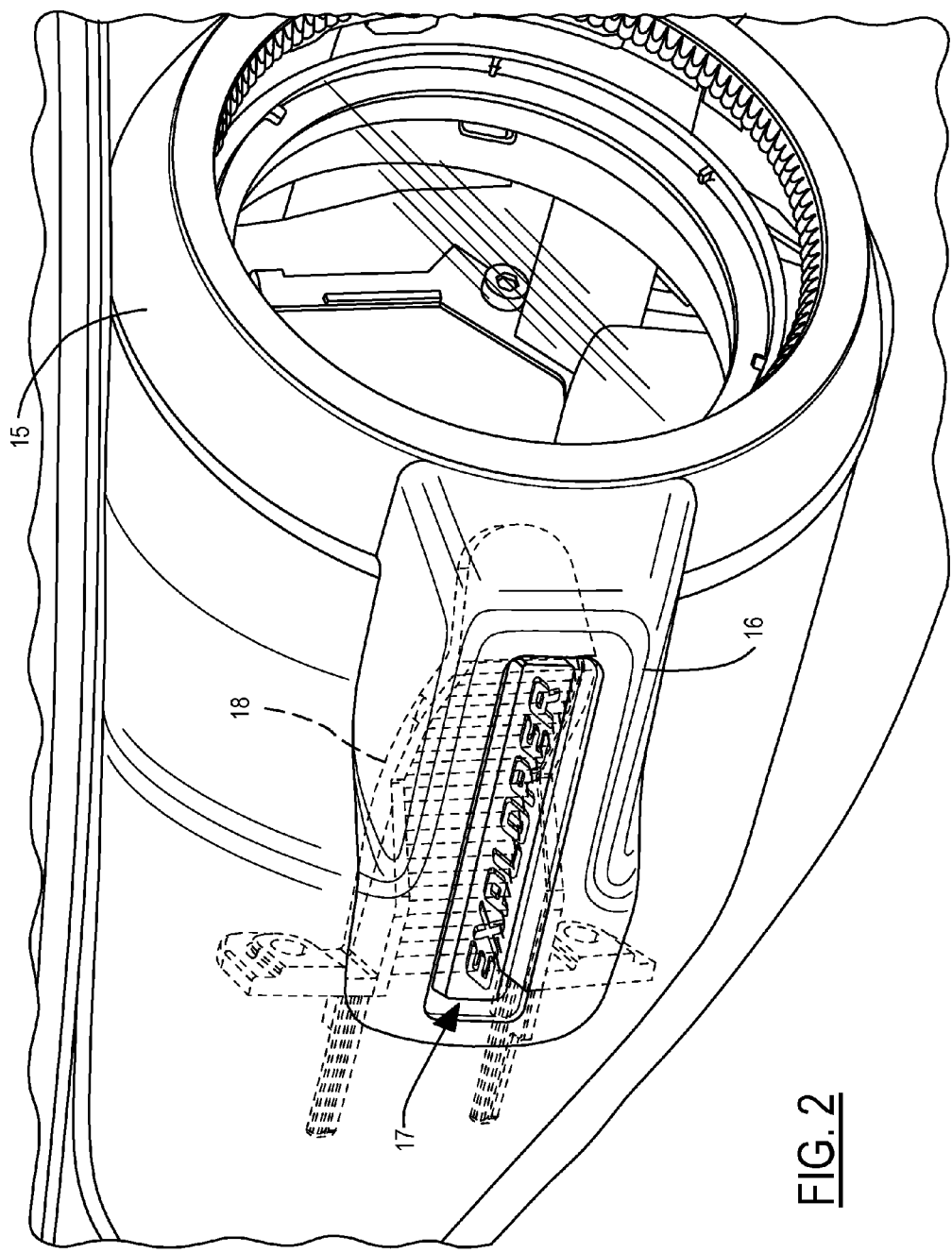
FIG. 2 is a perspective view showing a bezel and refractor of the invention in greater detail.

As shown in greater detail in FIG. 2, front ring 15 and side bezel 16 are preferably fabricated as a single molded part. A light refracting element 18 may be mounted behind side bezel 16 in a light path from the light source in order to divert a selected amount of light toward signature image 17. Refracting element 18 may improve the evenness of illumination across the signature image. A refracting element is not necessary in all embodiments.

Figure 3:
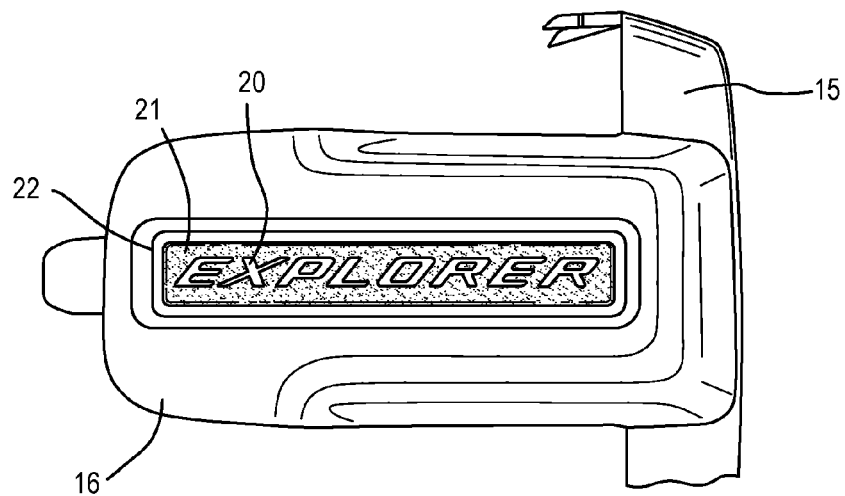
FIG. 3 is a side plan view of the Class A side of the bezel.

As shown in FIG. 3, the signature image may include a foreground region 20 and a background region 21. These regions have corresponding surface characteristics (on the Class A and/or Class B sides) to alter the light transmission through one or both of the regions. In particular, the foreground region may be brighter (i.e., with more concentration of the transmitted light) by providing a smooth texture on both the Class A and Class B sides of the foreground region since a smooth surface provides maximum light transmission and minimum diffusion. In the example of FIG. 3, the foreground region is comprised of the letters of a name of the vehicle model. The background region comprises the area surrounding the letters and has a stippled texture on at least one of the Class A or Class B sides (preferably the Class A side) to diffuse a controlled portion of the light. The more diffuse (i.e., less concentrated) light emerging from the stippled texture creates an apparent reduction in brightness so that there is contrast between foreground region 20 and background region 21. In a preferred embodiment, the foreground region may be raised with respect to the background region to improve visibility of the foreground region under ambient daylight conditions and to give the edge of the letters a sharper appearance. A skirt 22 may be provided around the signature image to further accentuate the area of the signature image. Skirt 22 may preferably be comprised of a groove or other change in depth around the signature image. In an embodiment wherein the foreground and background regions are not covered by the metallization layer, it is preferable that skirt 22 is covered by the metallization layer to further highlight the signature image.

As contemplated herein, the foreground region could also refer to the area around the letters of a name and the background region could comprise the letters, so that the text or other graphic would be perceived as a negative image. In other words, the background region could be smooth while the foreground region has a stippled texture.

Diffusion of the emitted light at any particular region of the Class A surface with a stippled texture is controlled by the grain of the stipple provided to the surface in that region. Rather than either of the regions having a smooth surface, they could both have a stippled texture with contrasting grains. Light scattering of the stipple grains is determined by both grain density and depth. Generally, the higher the density (e.g., grains per square millimeter) then the greater the scattering, and the higher the grain heights then the greater the scattering. Different combinations of density and height give rise to surfaces with different Lambertian scattering characteristics. Mold makers offer various choices of grain textures, which may be created on a mold using acid etching or sandblasting, for example. Grains having a greater or lesser amount of light scattering are easily determined so that the diffusion of light at any corresponding region can be controlled. When contrasting grains are used by the present invention, they shall be referred to as a mild grain and an aggressive grain. The mild grain has a first predetermined combination of grain density and height that results in less scattering than the aggressive grain which has a second predetermined combination of grain density and height.

Figure 4:
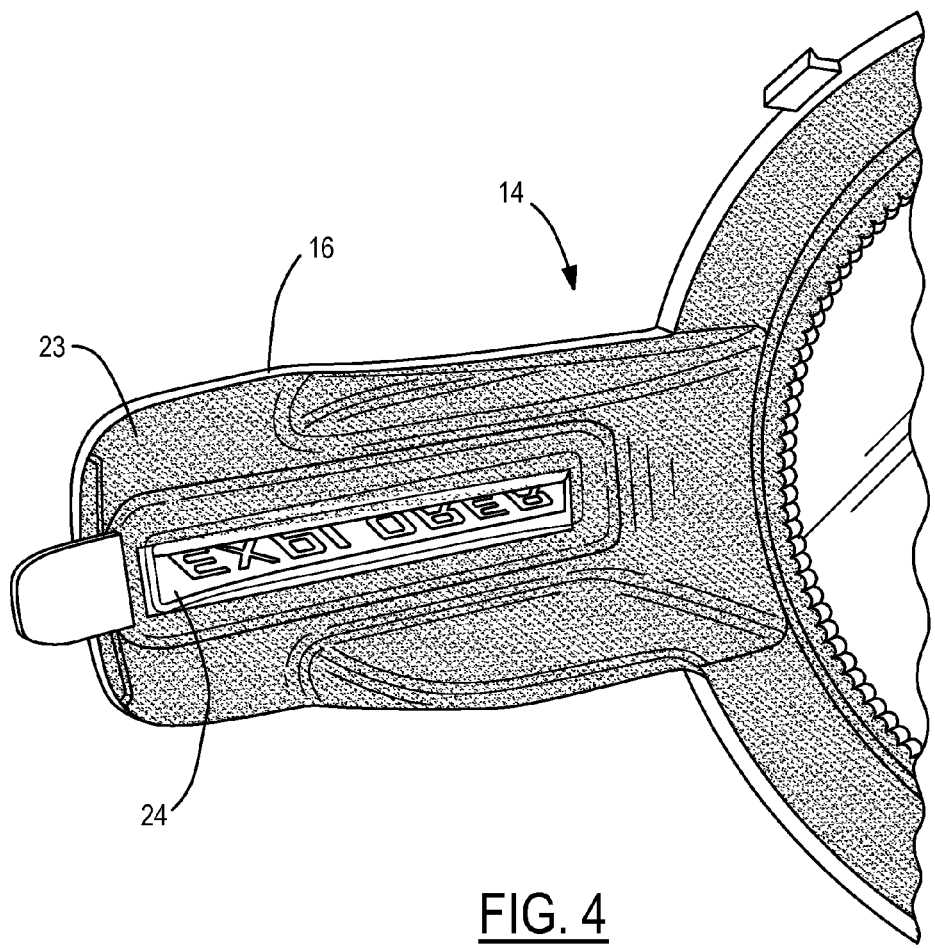
FIG. 4 is an interior view of the Class B side of the bezel.

In areas other than the signature image, it is preferable that no light be transmitted through trim piece 14. Since it is desirable to fabricate trim piece 14 from one integrally molded material which is transparent, and since it is also desirable that the metallization layer is formed with the same thickness over all parts of the Class A surface, the Class B surface away from the signature image area is used to reduce the light transmission into and through trim piece 14 in the corresponding areas. As shown in FIG. 4, a stipple texture is applied at a Class B surface 23. It is applied substantially continuously on the Class B side of trim piece 14 everywhere except at a region 24 behind the foreground and background regions of the signature image. Stipple texture 23 on the Class B side acts as a filter wherein light is directed away from trim piece 14. The light that does not enter trim piece 14 cannot be transmitted to the Class A side. Depending on other properties of the trim piece and the lighting system, the diffusion/filtering needed may result in a stipple grain on the Class B side that could be either more or less aggressive than the grain used at the Class A side of the signature image.

Figure 5:
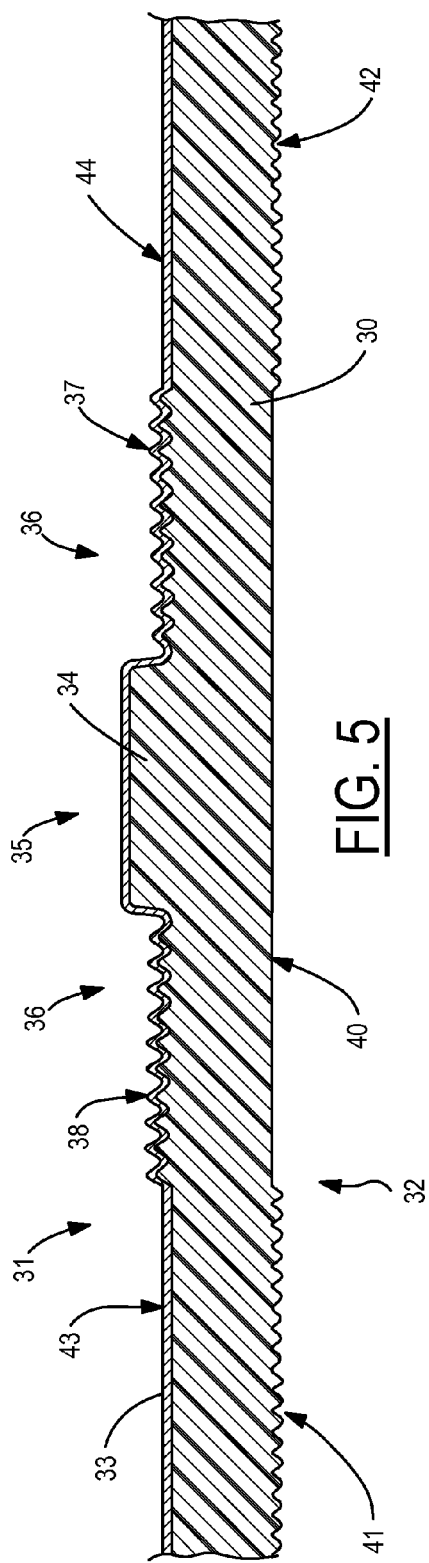
FIG. 5 is a cross-sectional view of a generic bezel surface showing the various surface textures that can be used in the present invention.

FIG. 5 illustrates various combinations of surface shapes and textures that can be used in the present invention to create the desired illumination effects. A trim piece 30 has a Class A external side 31 and a Class B internal side 32. The Class A side 31 has a metallization layer 33 covering the entire outer surface. A raised feature 34 is included in a foreground region 35 of a signature image. Background region 36 is adjacent foreground region 35. A stippled texture 37 and 38 with a first predetermined grain is provided in background region 36 in order to provide sufficient light diffusion that the signature image becomes readily visible. A smooth surface texture is provided in foreground region 35 and at a region 40 on the Class B surface behind both the foreground and background regions of the signature image. The remainder of the Class B surface (e.g., a framing area surrounding the signature image) has a stipple texture 41 and 42 with a second predetermined grain to provide sufficient scattering of light so that no light is emitted in the areas around the signature image. On the Class A side of trim piece 30, smooth surfaces 43 and 44 are provided around the signature image so that the remainder of the Class A side of trim piece 30 has a polished appearance.

In one preferred embodiment, the first predetermined grain in the background region on the Class A side had a grain height of 0.00125 inches while the second predetermined grain on the Class B side had a grain height of 0.00100 inches.

Figure 6:
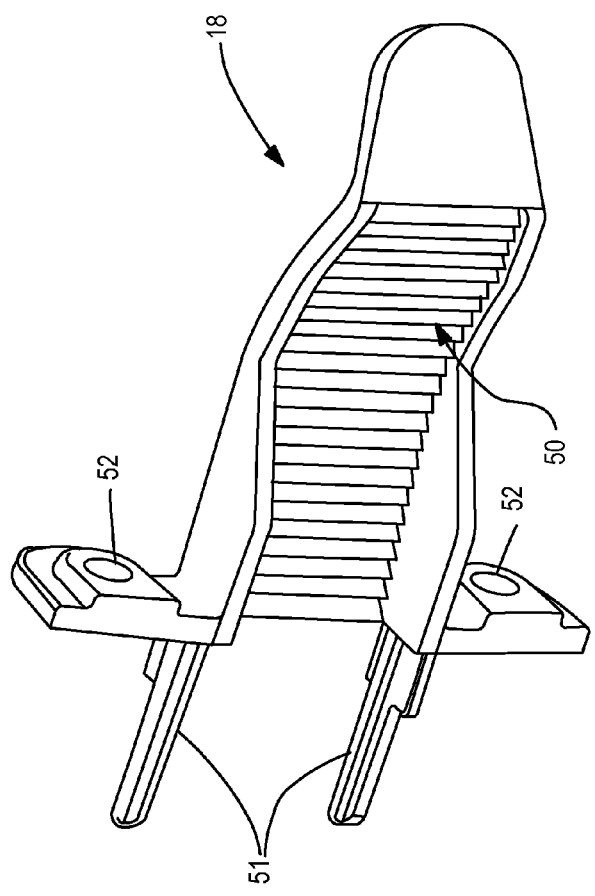
FIG. 6 is a perspective view of one embodiment of a refractor.

A light refracting element 18 is shown in greater detail in FIG. 6. One side of refracting element 18 has a series of wedges 50 while the other side has a substantially smooth surface. Light is refracted at the smooth surface into the refracting element and out wedges 50 in order to direct light toward the side bezel. A pair of alignment pins 51 project from element 18 to be received in the lamp housing in order to align refracting element 18 with the side bezel. Flanges 52 include screw holes for making an attachment to the light housing (not shown).

Figure 7:
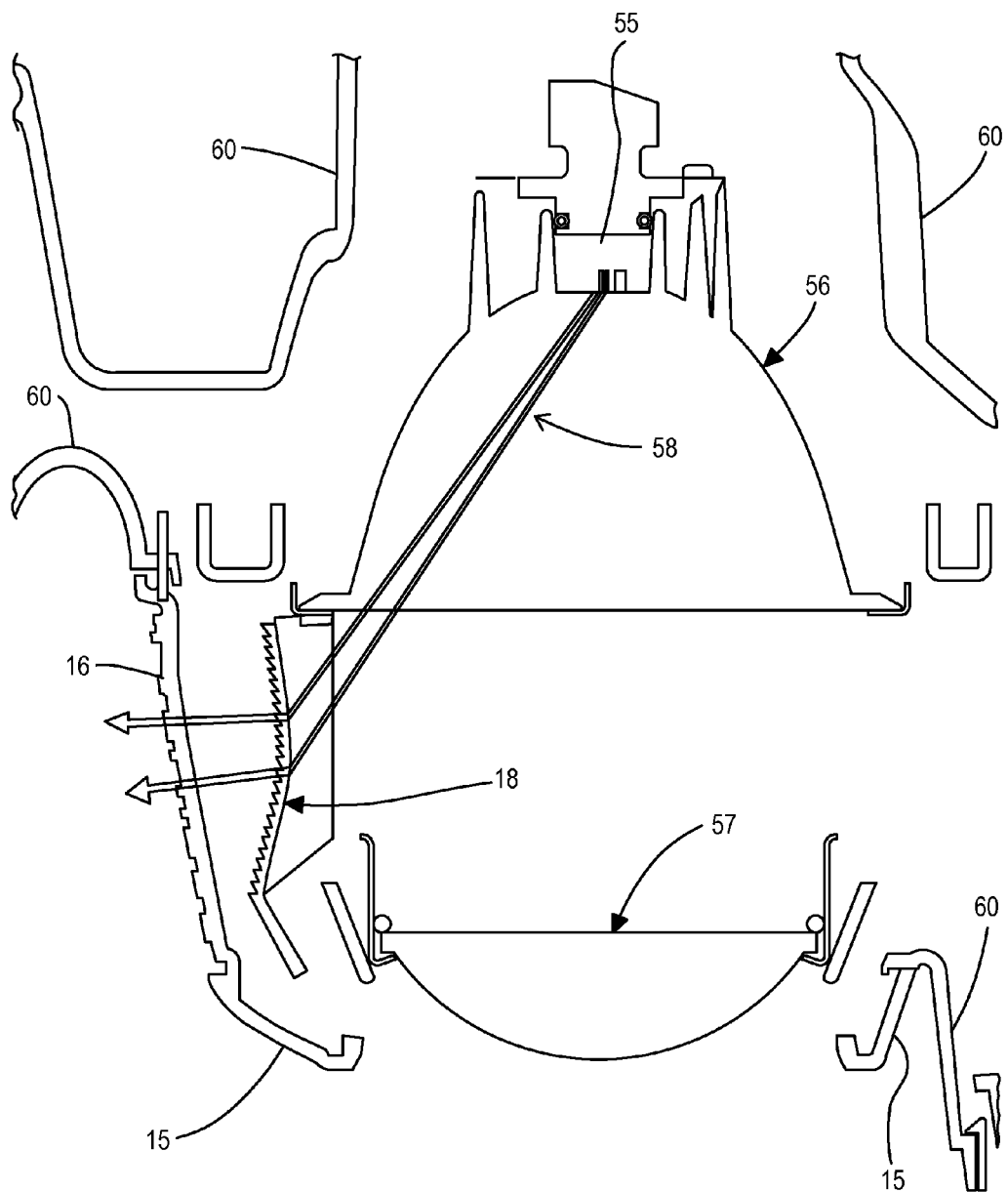
FIG. 7 is partial cross section of the headlamp system.

FIG. 7 is a horizontal cross-section through the lighting system wherein a light source 55 is mounted together with a reflecting element 56. Light from the light source and the reflector are focused by a projecting lens system 57 for providing a light beam toward the roadway. Additional light rays 58 from the light source 55 are diverted by refracting element 18 toward side bezel 16. Reference number 60 shows other structures within the housing of the lighting system.

In view of the foregoing description, the invention has provided a method and system for illuminating a signature image formed on a trim piece of a vehicle lighting system mounted adjacent a light source and having an inner surface illuminated by light from the light source and an outer surface visible from outside the vehicle. The trim piece comprises a light transmitting plastic body, wherein the signature image has a foreground region and a background region within a relatively opaque framing area of the trim piece. A portion of the light produced by the light source is diverted toward the signature image and the relatively opaque framing area. The light directed toward one of the background region or the foreground region passes through a first surface texture that causes a first amount of diffusion of the light. The light directed toward the other one of the background region or the foreground region passes through a second surface texture that causes a second amount of diffusion of the light that is less than the first amount of diffusion. The light directed toward the relatively opaque framing area is substantially blocked due to a third surface texture that causes a third amount of light diffusion that is greater than the first amount of diffusion.

What is claimed is:

1. A lighting system for a vehicle, comprising:
   a headlamp light source;
   a trim piece mounted adjacent the light source and having an inner surface illuminated by light from the light source and an outer surface visible from outside the vehicle, wherein the trim piece comprises an integrally molded light transmitting plastic body, wherein a signature image is formed on the body having a foreground region and a background region, wherein the foreground region has a corresponding surface characteristic on the inner and outer surfaces within the foreground region different from a corresponding surface characteristic on the inner and outer surfaces within the background region so that more light from the light source is transmitted through the foreground region than through the background region.

2. The system of claim 1 wherein the surface characteristic is comprised of a smooth texture for one of the foreground region or background region, and wherein the surface characteristic is comprised of a stippled texture for the other one of the foreground region or background region.

3. The system of claim 2 wherein the stippled texture is included on the outer surface.

4. The system of claim 2 wherein the stippled texture of the foreground or background region has a mild grain, and wherein at least one of the inner surface or outer surface outside of the signature image is comprised of a stippled texture having an aggressive grain to provide greater scattering of light than the mild grain.

5. The system of claim 2 wherein the foreground region has the smooth texture and the background region has the stippled texture.

6. The system of claim 1 wherein the foreground region is raised with respect to the background region.

7. The system of claim 1 wherein the trim piece further comprises a metallization layer applied to at least a portion of the outer surface.

8. The system of claim 7 wherein the metallization layer covers the foreground regions and the background region.

9. The system of claim 1 further comprising a refracting element disposed in a first light path from the light source to divert light from the first light path to a second light path toward the signature image.

10. The system of claim 1 wherein the trim piece forms a skirt around the periphery of the signature image.

11. The system of claim 10 wherein the trim piece further comprises a metallization layer applied to the outer surface over the skirt and not over the signature image.

12. A bezel for a vehicle headlamp, comprising:
   an integrally molded light transmitting plastic body with inner and outer surfaces, wherein a signature image is formed on the body having a foreground region with a first surface texture and a background region with a second surface texture, wherein light diffusion by the first and second surface textures are perceptibly different; and
   a light-transmitting metallization layer over the outer surface.

13. The bezel of claim 12 wherein the first surface texture is substantially smooth and the second surface texture is stippled.

* * * * *